United States Patent
Corbett

(12) 
(10) Patent No.: US 6,504,828 B1
(45) Date of Patent: Jan. 7, 2003

(54) ADAPTIVE HANDOFF ALGORITHMS FOR MOBILES OPERATING IN CDMA SYSTEMS

(75) Inventor: Eddie Corbett, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/265,969

(22) Filed: Mar. 11, 1999

(51) Int. Cl.$^7$ ............... H04Q 7/00; H04Q 7/20
(52) U.S. Cl. ................... 370/331; 455/437
(58) Field of Search ............... 455/435–444; 370/331–333

(56) References Cited

U.S. PATENT DOCUMENTS

| | | | |
|---|---|---|---|
| 5,623,535 A | * | 4/1997 | Leung et al. |
| 6,021,123 A | * | 2/2000 | Mimura ............... 370/331 |
| 6,269,087 B1 | * | 7/2001 | Nakamura et al. ....... 370/331 |
| 6,275,703 B1 | * | 8/2001 | Kalev ............... 455/436 |

FOREIGN PATENT DOCUMENTS

| | | |
|---|---|---|
| EP | 0 785 696 | 7/1997 |
| EP | 0 920 230 | 6/1999 |
| GB | 2 313 258 | 11/1997 |

OTHER PUBLICATIONS

Wang, Szu–Wei, et al., "Effects of Soft Handoff, Frequency Reuse and Non–Ideal Antenna Sectorization on CDMA Systems Capacity", 1993 43$^{rd}$ IEEE Vehicular Technology Conference, Secaucus, New Jersey, May 18–20, 1993, pps. 850–854.

* cited by examiner

Primary Examiner—Nguyen T. Vo

(57) ABSTRACT

An adaptive handoff algorithm that governs mobile handoffs between sectors within base stations in a CDMA system is disclosed. The handoff algorithm is selected according to the type of service requested by the mobile. Further, the handoff algorithm uses various quality measures in order to induce mobile handoffs that result in desirable operating conditions for the type of service requested by the mobile. For example, a voice call may result in an handoff algorithm that induces the mobile to handoff to sectors that minimizes the mobile output power in order to maximize battery capacity and decrease uplink interference. Moreover, another algorithm may be implemented for packet intensive services, such as internet web browsing, to induce the mobile to handoff to sectors that result in reduced downlink output power, which tends to decrease interference in the cell.

14 Claims, 2 Drawing Sheets

ADAPTIVE HANDOFF ALGORITHMS FOR MOBILES OPERATING IN CDMA SYSTEMS

FIELD OF THE INVENTION

The present invention relates generally to wireless radio telecommunication systems, more particularly, it relates to the use of adaptive handoff algorithms for mobiles operating in CDMA systems.

BACKGROUND OF THE INVENTION

Code division multiple access (CDMA) telecommunication systems, especially those designated as the so-called third generation wideband systems, such as CDMA (WCDMA) for example, were designed to provide access services that include circuit switched and packet switched data services having substantially improved bit rate performance. Such high bit-rate performance supported by third generation wideband systems gives rise to a multitude of services such as wireless multimedia and video, wireless data services such as simultaneous voice, and enhanced internet services.

The operating requirements of the various services may be considerably different thereby demanding correspondingly different performance levels from the system. By way of example, the characteristics of a circuit switched voice call typically are delay sensitive (i.e. no excessive breaks in the conversation which disrupts flow) high mobility, relatively short call duration, and symmetrical service (i.e. same amount of data is sent in both uplink and downlink directions). In contrast, packet based services such as internet web browsing are typically characterized by being delay insensitive (errant packets may be retransmitted), low mobility, relatively long call duration, and asymmetrical service i.e. downlink direction is typically more heavily used when loading web pages, for example. There are numerous factors that may affect the performance of various services operating within a CDMA system. One such factor that is known to affect the performance of typical services is mobile station handoffs.

FIG. 1 illustrates a basic cellular telecommunication system having a radio network controller (RNC) linked to a network of base stations by a series of digital transmission links 115. The base stations are geographically dispersed to form an area of coverage for the system. Each base station (BS) is designated to cover a specified area, known as a cell, in which t two way radio communication connection can take place between a mobile station and the BS in the associated cell. The boundary between the cells is indicated by line 110. In this simplified exemplary depiction, only two base stations are shown but in practice, a substantial multiplicity of base stations will form the junctional coverage area for the system. It is understood by those skilled in the art that other components and devices are typically included in the system that are not shown in the exemplary illustration. In general, as the MS moves throughout the network, communications are maintained with the network by transferring the connection to a neighboring base station in an event referred to as a handoff. For simplicity, the term mobile station will henceforth be referred to as the mobile.

In telecommunication systems operating in accordance with code division multiple access (CDMA), macro diversity is typically employed where a mobile simultaneously communicates with more than one BS prior to a handoff from an originating BS to a neighboring BS. This is referred to in the art as "soft handoff" in that the mobile will commence communication with the neighboring BS before terminating communication with the originating BS. This "make before break" procedure is made possible by operating all traffic on a common spread spectrum waveform frequency. A variant of the soft handoff is what is referred to as "softer handoff" in which the mobile simultaneously communicates with multiple sectors of the same BS. There are several advantages associated with soft handoffs such as reduced risk of dropped calls, no interruption in speech upon handoff, and increased gain in downlink signal-to-noise ratio. Another important advantage of soft handoff/softer handoff is that of macro diversity during mobility i.e. greater protection from log normal and multi-path fading since, on average, the convergence from the effects of fading or multi-paths do not occur at the same time.

Another type of handoff that occurs in CDMA systems is a "hard handoff." A hard handoff is a handoff that typically takes place, for example, between two channels or when the base stations are not suitably synchronized for a soft handoff. This type of handoff is often characterized as "break before make" since communication on a first frequency is terminated before communication is established on a second frequency. Hard handoffs occurring within the same cell are referred to as intra-cell hard handoffs and those occurring between cells are referred to as inter-cell hard handoffs. Hard handoffs typically occur in situations where vendor equipment limitations preclude performing soft handoffs such as, for example, layer changes for moving mobiles, mode switches e.g. in dual mode systems, switching between operator networks, and resource allocation issues that require hard handoffs.

In an exemplary CDMA system, handoff decisions are typically based on the detection by the mobile of the signal strength of pilot signals transmitted by neighboring base stations. The pilot signals are distinguished by a pseudonoise sequence (PN) such that the mobile is able to determine and allocate the base station within a distinct classification set. By way of example, the sets include an Active Set which is a set of base stations that the mobile is actively communicating with, a Candidate Set which is a set of base stations that have pilot strengths that are sufficient for communications based on system parameters set by the base station, and a Neighbor Set which is a set of base stations in the area that have a pilot strength indicating the potential for sufficient communication with the mobile. However, those skilled in the art will appreciate that the sets referred to and their functions are referenced by the CDMA standard known as IS-95 but that they have analogous counterparts with similar functions in other CDMA standards which may be identified differently. The base station's classification within a set may be changed in accordance with, e.g., the received pilot signal strength by the mobile. Handoff decisions are then made by the system controller which are typically base its decision, at least in part, on the reported pilot signal strength and other criteria.

In the prior art, handoffs, that occur during voice and data services, are typically based on handoff algorithms that are unchanging and without regard to the impact on service performance. Accordingly, it is a object of the present invention to provide technique for utilizing handoff algorithms that adapt to the type of service requested.

SUMMARY OF THE INVENTION

To achieve the foregoing and other objectives in accordance with the purpose of the invention, an adaptive handoff algorithm governing mobile handoffs between sectors of the same or other base stations within a CDMA system is disclosed. In an embodiment of the invention, the handoff algorithm, using certain quality measures, is implemented in response to the particular type of service requested by the mobile. Handoffs governed by the handoff algorithm tend to lead to desirable operating environment for the mobile. By way of example, when a service such as a voice call is requested, the handoff algorithm uses a quality measure that takes into account the pathloss and uplink interference. This tends to induce handoffs that result the mobile connecting to a base station where output power of the mobile is minimized. This situation is desirable for conserving battery capacity of the mobile. In a further example, if the mobile is using a data intensive application such as internet browsing, the handoff algorithm uses a quality measure that induces the mobile to handoff to sectors that result in reduced downlink output power levels by the base stations. This tends to decrease the interference levels in the cell, thereby improving the chances of receiving the transmitted packets correctly and thus reducing the need for repeat transmissions.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
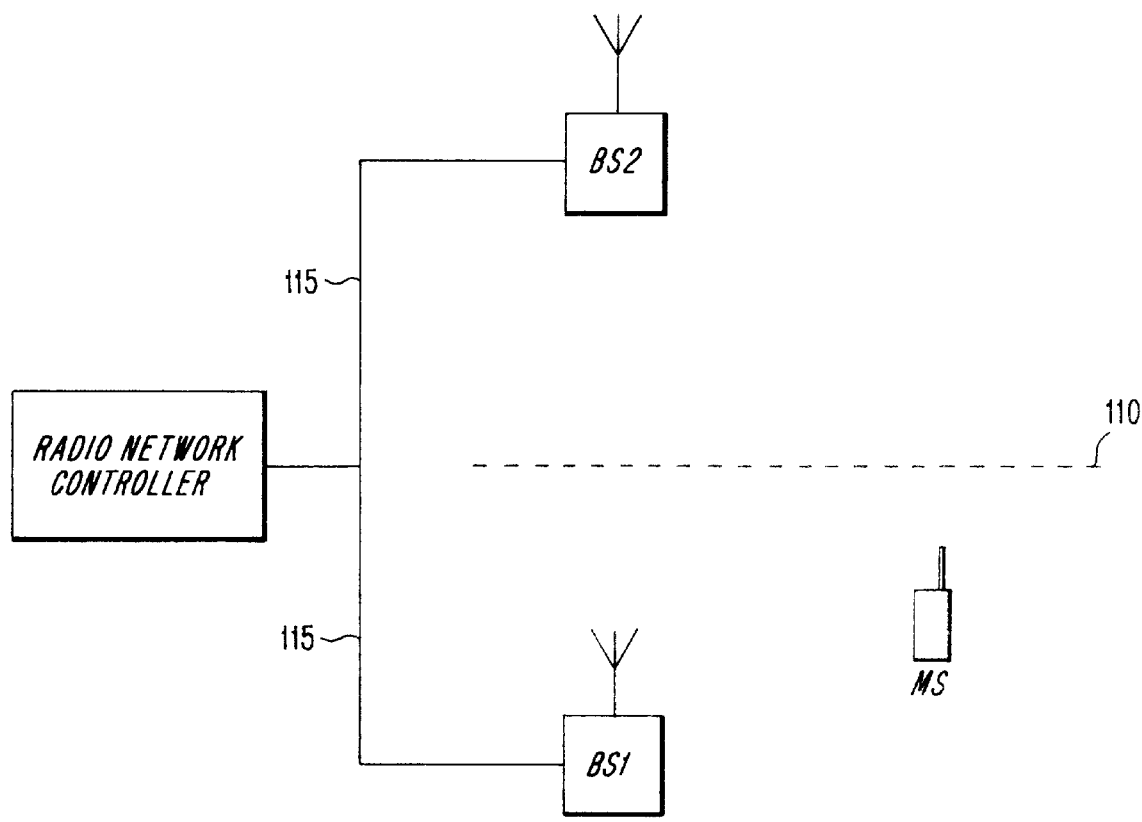
FIG. 1 illustrates a simplified exemplary wireless telecommunication system.

In typical CDMA systems, the mobile plays an active role in handoff procedures. While engaged in a call or packet data transfer, the mobile continuously monitors the pilot signal levels from sectors of the same or neighboring base stations in preparation to perform a softer/soft handoff. In addition to the mobile, the base station (BS) and the radio network controller (RNC) is also involved in the evaluation of the new sectors. The mobile reports to the RNC those sectors or pilots having signal levels above a defined threshold. The threshold may be predetermined or dynamic and is generally based on a given set of measures such as signal strength or signal quality. The RNC, based on this information, directs the mobile to add or remove sectors from its Active Set, i.e. those sectors that the mobile is simultaneously communicating with.

The quality and user's experience of a requested service, such as voice call, may be affected by a handoff event which is typically triggered by movement the mobile away from a BS with which it has an established link. System parameters associated with handoff procedures are typically set by operators and thus issues such as evaluating sectors for the Active Set based on quality measures may impact the service experience. By way of example, in an exemplary CDMA system, an evaluation is made by comparing the measured value of a quality estimate, called the HO_quality_estimate, from each sector in the mobile's neighbor set where a received signal is detected. A parameter HO_quality_measure represents the quality measure used for determining the HO_quality_estimate. A handoff algorithm uses the HO_quality_estimate to determine the contents of the Active Set, i.e. sectors that should be added or removed. Hence, the handoff algorithm is able to use different quality measures for different types of services.

In accordance with an exemplary embodiment of the present invention, the various quality measures include:
(I) HO_quality_measure=Pathloss;
(II) HO_quality_measure=Pathloss+Uplink Interference;
(III) HO_quality_measure=Downlink RSSI; and
(IV) HO_quality_measure=Downlink $E_b/I_o$.

Wherein the pathloss in quality measure (I) is estimated by the mobile by reading a transmitted power level value of the pilot signal that is broadcast by the BS and subtracting the actual received signal strength by the mobile. A handoff algorithm predicated on pathloss tends to result in the mobile connecting to the nearest BS. Quality measure (II) takes into account the pathloss and the uplink interference measured by the BS. Thus a handoff algorithm predicated on this tends to lead to the mobile connecting to the BS requiring the least amount of transmission power thereby minimizing the mobile output power necessary for the connection. In quality measure (III), the handoff algorithm is based on the received signal strength (RSSI) measured by the mobile. This tends to result in the mobile connecting to the sector with the strongest pilot signal. In quality measure (IV), the Downlink $E_b/I_o$ is an interference measure which is related to the energy per chip divided by the power spectral density of the interference and is indicative of the quality and strength of coverage. A handoff algorithm based on this tends to result in the mobile connecting to the sector where the BS needs the least amount of power, i.e., the algorithm tends to steer the mobile to the sector having the least amount of downlink interference.

In the exemplary embodiment, the handoff algorithm uses the most suitable HO_quality_measure for a particular type of service. For a voice call, for example, it would be desirable to minimize the mobile output power as much as possible in order to conserve battery capacity and reduce the overall uplink interference in the cell, thereby making quality measure (II) more suitable. On the other hand, internet web browsing typically requires much more downlink capacity as compared to the uplink thereby making quality measure (IV) a suitable choice. A downlink intensive service such as web browsing benefits from minimizing the downlink output power which typically lowers overall downlink interference levels in the cell resulting in less repeated packets being retransmitted. Repeated packets result in more transmissions that contribute to higher levels of interference in the cell as well as delayed data transactions.

Figure 2:
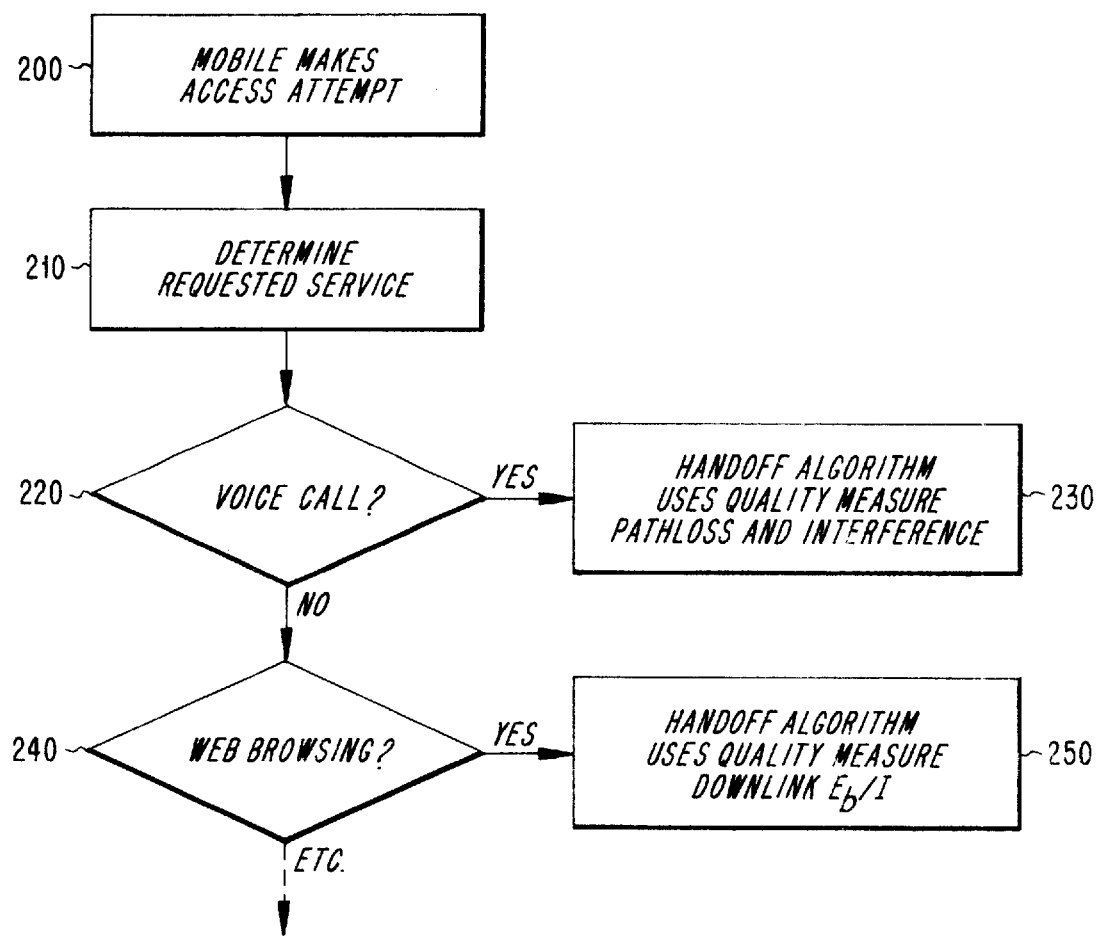
FIG. 2 illustrates an exemplification of the present invention.

FIG. 2 illustrates an exemplification of the above described embodiment. In step 200, a mobile makes an access request to the system radio controller in a CDMA system, wherein the type of service requested by the mobile is determined by the RNC, as shown in step 210. In step 220, if the mobile is performing a voice call, the handoff algorithm uses both the pathloss and the uplink inference as the quality measure, as shown in step 230. If, as shown in step 240, the mobile is browsing the internet, e.g., the handoff algorithm uses a quality measure that includes the downlink $E_b/I_o$ in order to reduce cell interference, as shown in step 250. Another example using the adaptive techniques described is during a multimedia session where the handoff algorithm can be chosen to favor the video portion, since video data generally requires much more capacity as compared to voice data. The general concept being that when multimedia services are performed, the service (video) which requires the highest grade of service should determine the selection of handoff algorithm.

Other possible exemplifications using handoff algorithms may include combining quality measures during an individual service, for example during a voice call, it may be desirable to use a quality measure that is inclined to minimize mobile output power when, e.g., 70% of the mobiles in the cell are relatively far from the BS in order to reduce the interference in the cell. Likewise, another quality measure inducing lower BS output power is desirable when a majority of mobiles are operating close to the BS.

Although the invention has; been described in some respects with reference to a specified preferred embodiment, variations and modifications will become apparent to those skilled in the art. In particular, alternative quality measures can be used, e.g., those based on other quality measures (e.g., bit error rate, cumulative interference affecting cell breathing) or which include non-quality related parameters, e.g., service type availability. Moreover, although exemplary handoff algorithms are described with respect to) soft handoff, those skilled in the art will appreciate that the present invention may apply handoff algorithms to hard handoffs within CDMA systems, e.g., those made to improve data rates for packet switched services. It is therefore, the intention that the following claims should not be given a restrictive interpretation but should be viewed to encompass variations and modifications that are derived from the inventive subject matter disclosed.

What is claimed is:

1. In a CDMA system having a radio network controller, a plurality of base stations, and a mobile capable of establishing a simultaneous communication link with at least two sectors within said base stations, and wherein the mobile performs a handoff, governed by a handoff algorithm, between said sectors in order to continue the communication link, a method of handing off a mobile comprising the steps of:

determining the type of service requested by the mobile;
   selecting a suitable handoff algorithm for the mobile in response to the determined type of service; and
   applying the selected handoff algorithm for the mobile.

2. A method according to claim 1 wherein the type of service is a voice call thereby invoking a handoff algorithm that favors minimizing the output power of the mobile.

3. A method according to claim 1 wherein the type of service is a data intensive service thereby invoking a handoff algorithm that favors minimizing downlink output power.

4. A method according to claim 3 wherein the data intensive service is Internet based browsing.

5. A method according to claim 1 wherein the handoff algorithm is based on any one of pathloss, pathloss and uplink interference, downlink received signal strength (RSSI), and downlink interference ($E_b/I_o$).

6. In a CDMA system having a radio network controller, a plurality of base stations, and a mobile capable of establishing a simultaneous communication link with multiple sectors within said base stations, and wherein the mobile performs a handoff, governed by a handoff algorithm, between said sectors in order to continue the communication link, an adaptive handoff algorithm predicated on quality measures that include signal pathloss, pathloss and uplink interference, downlink received signal strength (RSSI), and downlink interference ($E_b/I_o$) such that tile specific quality measure used by the handoff algorithm is based on the type of service requested.

7. An adaptive handoff algorithm according to claim 6 wherein if the requested service is a voice call, the pathloss and interference is used by the handoff algorithm to induce mobile handoffs that tend to minimize mobile output power.

8. An adaptive handoff algorithm according to claim 6 wherein if the requested service is internet web browsing, the downlink interference (E/I) is used by the handoff algorithm to induce mobile handoffs that then to reduce downlike output powers thereby decreasing the overall interference level in a corresponding cell.

9. An adaptive handoff algorithm according to claim 6 wherein the handoff algorithm is applied to mobiles performing any one of soft handoffs and hard handoffs.

10. A mobile unit for operation in a CDMA system with a plurality of base stations and one or more radio network controllers, the mobile being capable of establishing simultaneous communication with at least two sectors within said base stations and performing a handoff between said sectors, the mobile comprising:

means for selecting a suitable handoff algorithm according to a requested type of service, and
    means for applying the selected handoff algorithm to perform the handoff.

11. A mobile unit according to claim 10 wherein the type of service is a voice call thereby invoking a handoff algorithm that favors minimizing the output power of the mobile.

12. A mobile unit according to claim 10 wherein the type of service is a data intensive service thereby invoking a handoff algorithm that favors minimizing downlink output power.

13. A mobile unit according to claim 12 wherein the data intensive service is Internet based browsing.

14. A mobile unit according to claim 10 wherein the handoff algorithm is based on any one of pathloss, pathloss and uplink interference, downlink received signal strength (RSSI), and downlink interference ($E_b/I_o$).

* * * * *